June 7, 1927.
I. KNIGHT
1,631,873
WHEEL RUNNER
Filed June 22, 1926
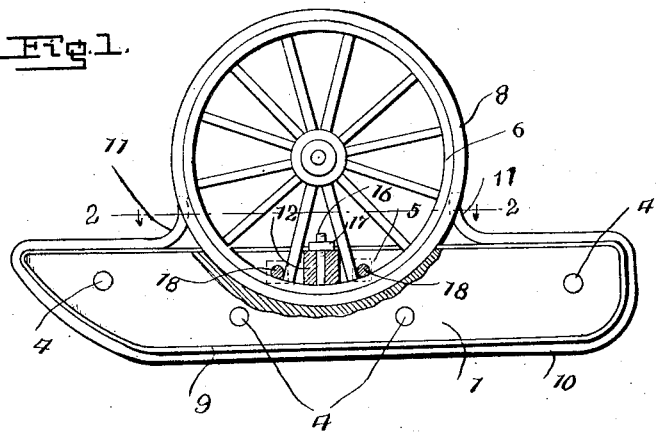
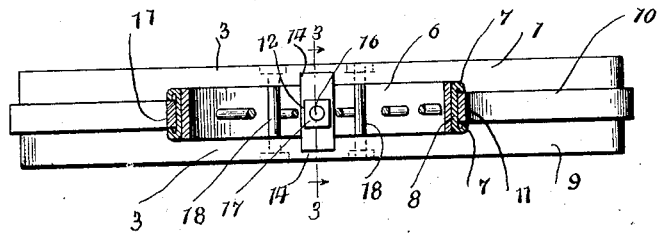
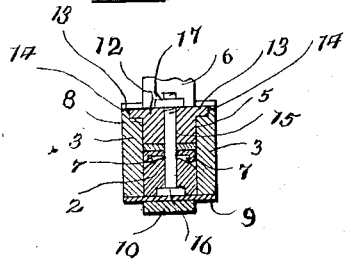
Inventor
Ira Knight
By Lacey & Lacey, Attorneys Patented June 7, 1927.

1,631,873

UNITED STATES PATENT OFFICE.

IRA KNIGHT, OF MIDLAND, MICHIGAN.

WHEEL RUNNER.

Application filed June 22, 1926. Serial No. 117,811.

This invention relates to vehicles and more particularly to an attachment which may be applied to a vehicle wheel and convert the vehicle into a sled.

One object of the invention is to provide a runner which may be readily applied to a wheel of an automobile or other vehicle after the tire has been removed from the tire carrying rim of the wheel and very securely held in place.

Another object of the invention is to provide the runner with a tread strip which may serve to prevent side skidding.

Another object of the invention is to so mount the tread strip upon the body portion of the runner that a portion of the strip will extend upwardly from the runner and constitute a brace adapted to engage the wheel rim between its tire-engaging flanges.

Another object of the invention is to provide the runner with fasteners adapted to very firmly hold the runner in engagement with a wheel but permit it to be easily and quickly removed.

This invention is illustrated in the accompanying drawing, wherein

Figure 1 is a view showing the improved runner applied to a vehicle wheel, the view being principally in side elevation but partially in longitudinal section;

Fig. 2 is a longitudinal sectional view taken on the line 2—2 of Fig. 1;

Fig. 3 is a transverse sectional view taken on the line 3—3 of Fig. 2.

The runner forming the subject-matter of this invention includes a body portion 1 which is elongated with respect to the wheel to which it is to be applied and in the preferred form is approximately four feet long, eight inches wide and eight inches high. It will, of course, be understood that the dimensions may be varied according to the type and size of vehicle wheel to which it is to be applied. The body portion is preferably formed of wood, although it may be metal or any other material desired and may be formed as an integral structure or consist of a central bar 2 and side bars or plates 3 which have face to face contact with the central bar and are secured by rivets or other suitable fasteners 4 passed transversely through the bars. The upper portion of the central bar is cut-away intermediate its length to form a pocket 5 which opens through the top or upper edge face of the body portion, as shown in Fig. 1, and is formed with a longitudinally curved inner wall so that the vehicle wheel 6 to which the runner is to be applied may fit snugly into the pocket. Referring to Fig. 3, it will be seen that the inner wall of the pocket is also curved transversely so that it may project between the tire-engaging flanges 7 of the tire-carrying rim 8 and prevent the wheel from sliding transversely in the pocket or having twisting movement which might be liable to break or otherwise damage the side walls of the pocket when the wheel is turned to guide the vehicle. A protecting strip 9 extends along the under edge face of the body portion and is extended upwardly about its forward and rear ends and projected along the upper face of the body portion. The protecting strip may be shrunk into place or secured by suitable fasteners and will serve to protect the body portion from being damaged by contacting with sharp stones or other obstructions. There has also been provided a tread strip 10 which is preferably formed of steel. The tread strip is of less width than the protecting strip 9 but is of greater thickness and projects downwardly therefrom, as shown in Fig. 3. Referring to this figure, it will be seen that the tread strip will allow the runner to slide readily along ice or snow but will very effectively prevent it from skidding transversely as it has sharp edges at its sides. The tread strips extend longitudinally beneath the runner and has its end portions carried upwardly and extended along the upper edge face of the body to approximately the forward and rear ends of the pocket and may be secured in any desired manner. Each end portion of the tread strip is bent to extend upwardly and its upwardly extending portions form bracing arms 11 which are adapted to engage the peripheral face of the wheel between the tire-engaging flanges of its rim and assist in preventing the wheel from having transverse sliding or twisting movement in the pocket.

In order to securely but releasably hold the wheel in place with a portion thereof fitted into the pocket, there has been provided a retaining block 12 which fits snugly between the side walls thereof and at its upper end is formed with side arms 13 adapted to be received in recesses 14 formed in the side walls. An opening 15 is formed in the block to receive a bolt or pin 16 projecting upwardly from the inner wall of the pocket, and from an inspection of Figs. 2 and 3 it will be apparent that, when the securing nut 17 of the bolt is tightened, the block will be firmly held in clamping engagement with the rim of the wheel between two of the spokes and upward movement of the wheel effectively prevented. It should also be noted that, when the wheel is fitted into the pocket, the pin is passed through the opening of the rim through which the inflating tube of a tire normally projects and, therefore, the pin serves not only as a fastener element for the block but also as means to prevent rotation of the wheel within the pocket. Bolts 18 are passed through alined openings in the side walls of the pocket and passed through the wheel at approximately the intersection of certain of its spokes with its rim and serve to assist in preventing rotary or upward sliding movement of the wheel. The heads of the bolts and their securing nuts are countersunk so that they do not project from the sides of the body and will be prevented from being injured by striking obstructions in a roadway. By having the runner formed, as shown and described above, it may be very easily and quickly applied to a wheel or removed therefrom and when in place it will be securely held to the wheel and prevented from working loose.

Having thus described the invention, I claim:

1. A runner adapted to be applied to a vehicle wheel, said runner comprising an elongated body portion, means to secure the body portion to a wheel with portions extending forwardly and rearwardly from the wheel, and a tread strip extending along the under face of said body and having its end portions extended upwardly about the ends of the body and along its upper face in contact therewith and having its ends bent upwardly to provide braces adapted to engage the front and rear portion of a tire-carrying rim of a wheel between the tire-engaging side flanges of the rim.

2. A runner adapted to be applied to a vehicle wheel, said runner comprising an elongated body formed intermediate its length with a pocket opening through its upper face and adapted to receive a lower portion of a wheel, a stem extending upwardly from the inner wall of said pocket and adapted to project through a tire valve-receiving opening in the rim of the wheel, a block fitted into said pocket and slidable upon said pin into and out of position for gripping a wheel rim between spokes of the wheel, and a fastener carried by said stem to retain the block in gripping engagement with the wheel rim.

3. A runner adapted to be applied to a vehicle wheel, said runner comprising an elongated body formed intermediate its length with a pocket opening through its upper face and adapted to receive a lower portion of a wheel, a stem extending upwardly from the inner wall of said pocket and adapted to project through a tire valve-receiving opening in the rim of the wheel, a block fitted into said pocket and slidable upon said pin into and out of position for gripping a wheel rim between spokes of the wheel, said block having side extensions and the body portion being formed with seats at opposite sides of the pocket to receive the side extensions, and a fastener adjustably carried by said stem to engage said block and secure the same in the pocket.

In testimony whereof I affix my signature.

IRA KNIGHT. [L. S.]